(12) United States Patent
Gibson et al.

(10) Patent No.: US 8,086,992 B2
(45) Date of Patent: Dec. 27, 2011

(54) ENABLE TOP-DOWN SERVICE DESIGN

(75) Inventors: Bill Gibson, Woodinville, WA (US); Mark Groves, Monroe, WA (US); Ross Grayum, Monroe, WA (US); Vinay Bharadwaj, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1352 days.

(21) Appl. No.: 11/705,921

(22) Filed: Feb. 14, 2007

(65) Prior Publication Data

US 2008/0195998 A1    Aug. 14, 2008

(51) Int. Cl.
*G06F 9/44* (2006.01)
(52) U.S. Cl. .................................................. 717/100
(58) Field of Classification Search ................ 717/100, 717/104–109, 101
See application file for complete search history.

(56) References Cited

U.S. PATENT DOCUMENTS

| | | | |
|---|---|---|---|
| 5,544,066 A | | 8/1996 | Rostoker et al. |
| 5,553,002 A | | 9/1996 | Dangelo et al. |
| 5,838,583 A | * | 11/1998 | Varadarajan et al. ............ 716/9 |
| 5,912,678 A | | 6/1999 | Saxena et al. |
| 6,370,681 B1 | * | 4/2002 | Dellarocas et al. .......... 717/110 |
| 6,421,818 B1 | | 7/2002 | Dupenloup et al. |
| 6,718,533 B1 | * | 4/2004 | Schneider et al. ............ 717/100 |
| 2004/0148184 A1 | * | 7/2004 | Sadiq ................................. 705/1 |
| 2004/0153294 A1 | | 8/2004 | McConaghy |
| 2005/0251372 A1 | | 11/2005 | Takeuchi et al. |
| 2006/0020619 A1 | | 1/2006 | Netz et al. |
| 2008/0082959 A1 | * | 4/2008 | Fowler .......................... 717/104 |

FOREIGN PATENT DOCUMENTS

EP    0802493 A2    10/1997

OTHER PUBLICATIONS

"Top down Design in an Object Oriented World", http://www.cs.usfca.edu/~parrt/course/601/lectures/top.down.design.html.
Richard A. Zahniser, "The perils of top-down design", Date: 1988, vol. 13, pp. 22-24, Issue 2, http://delivery.acm.org/10.1145/50000/43850/p22-zahniser.pdf?key1=43850&key2=0205935611&coll=GUIDE&dl=GUIDE&CFID=6227910&CFTOKEN=4312232.

* cited by examiner

*Primary Examiner* — Anna Deng

(57) ABSTRACT

Various technologies and techniques are disclosed for providing a software development application that supports development using a top-down approach. The user creates a high-level system design for a system in the top-down design software development application. The user describes a behavior of the system by attaching technology-neutral original system endpoints and respective contracts to a plurality of system components. The user delegates each original system endpoint to a member endpoint of a corresponding technology-specific member component. The user supplies a concrete implementation for each of the corresponding technology-specific member components. Throughout this iterative development process, the high level system design is preserved.

8 Claims, 15 Drawing Sheets

ENABLE TOP-DOWN SERVICE DESIGN

BACKGROUND

Computer software is written by software developers using one or more software development programs. Traditional software applications are typically designed from the bottom up, meaning that the detailed components are first defined, and then composed into systems that can be further composed into higher-level systems. The bottom-up approach to software development encourages the software developer to think about the implementation details of the software at the very earliest stages of development. This often causes technology decisions to be made too early.

To address the problems to bottom-up software development, some top-down software development programs have been introduced. Using a top-down approach, systems are designed by starting with a high-level system design, and then by further refined down to the level of detailed components that implement the design. One problem with such top-down software development programs of today is that they do not allow the user to evolve their design without affecting higher level connections.

SUMMARY

Various technologies and techniques are disclosed for providing a software development application that supports development using a top-down approach. The user creates a high-level system design for a system using the top-down design software development application. The user describes a behavior of the system by attaching technology-neutral original system endpoints and respective contracts to a plurality of system components. The technology-neutral system endpoints can be connected among systems before or after the user delegates each original system endpoint to a member endpoint of a corresponding technology-specific member component.

The user supplies a concrete implementation for each of the corresponding technology-specific member components. In one implementation, the user provides the source code to implement a desired functionality for the particular member component. In another implementation, the user specifies information to call a third party application, such as a web service, to provide the desired functionality. Throughout this iterative development process, the high level system design is preserved.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
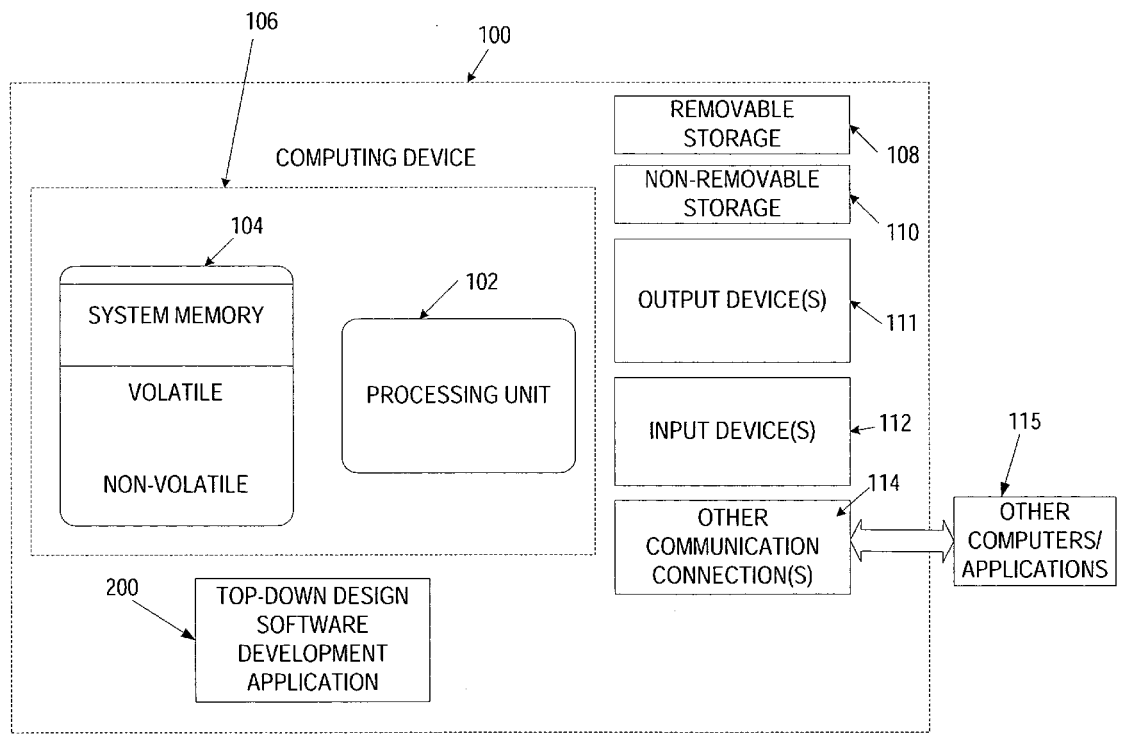
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application for developing software using a top-down design approach, but the system also serves other purposes in addition to these. In one implementation, one or more of the techniques described herein can be implemented as features within a software development program such as MICROSOFT® VISUAL STUDIO®, or from any other type of program or service that allows software developers to create software.

In one implementation, the system allows users to develop software by beginning with a high-level system design that does not contain any technology-specific implementation details, while then refining the design over a period of time to technology-specific details. To accomplish this, technology-neutral original system endpoints are first attached to system components. The term original system endpoint as used herein is meant to include endpoints that model communication between systems in a technology-independent manner. Contracts can be assigned to these technology-neutral original system endpoints to describe the behavior of the respective system component. Using an iterative process over time, the user then further refines each of these system components by decomposing the component into one or more member components that may be technology-neutral or may be technology-specific, and by delegating the technology-neutral original system endpoints of each system component to a member endpoint associated with a specific member component. Through a series of iterations the user will eventually decompose and transform each component in the original system design to technology-specific components with technology-specific endpoints. The design is complete when all components and endpoints at the lowest level are technology-specific. Each lowest-level member component is then provided with the implementation details, such as the actual source code for implementing the desired functionality, or a call to a third party system. The design of each higher level component and the design of the original system including all connections between endpoints at all levels are preserved throughout this entire iterative development process.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes top-down design software development application 200. Top-down design software development application 200 will be described in further detail in FIG. 2.

Figure 2:
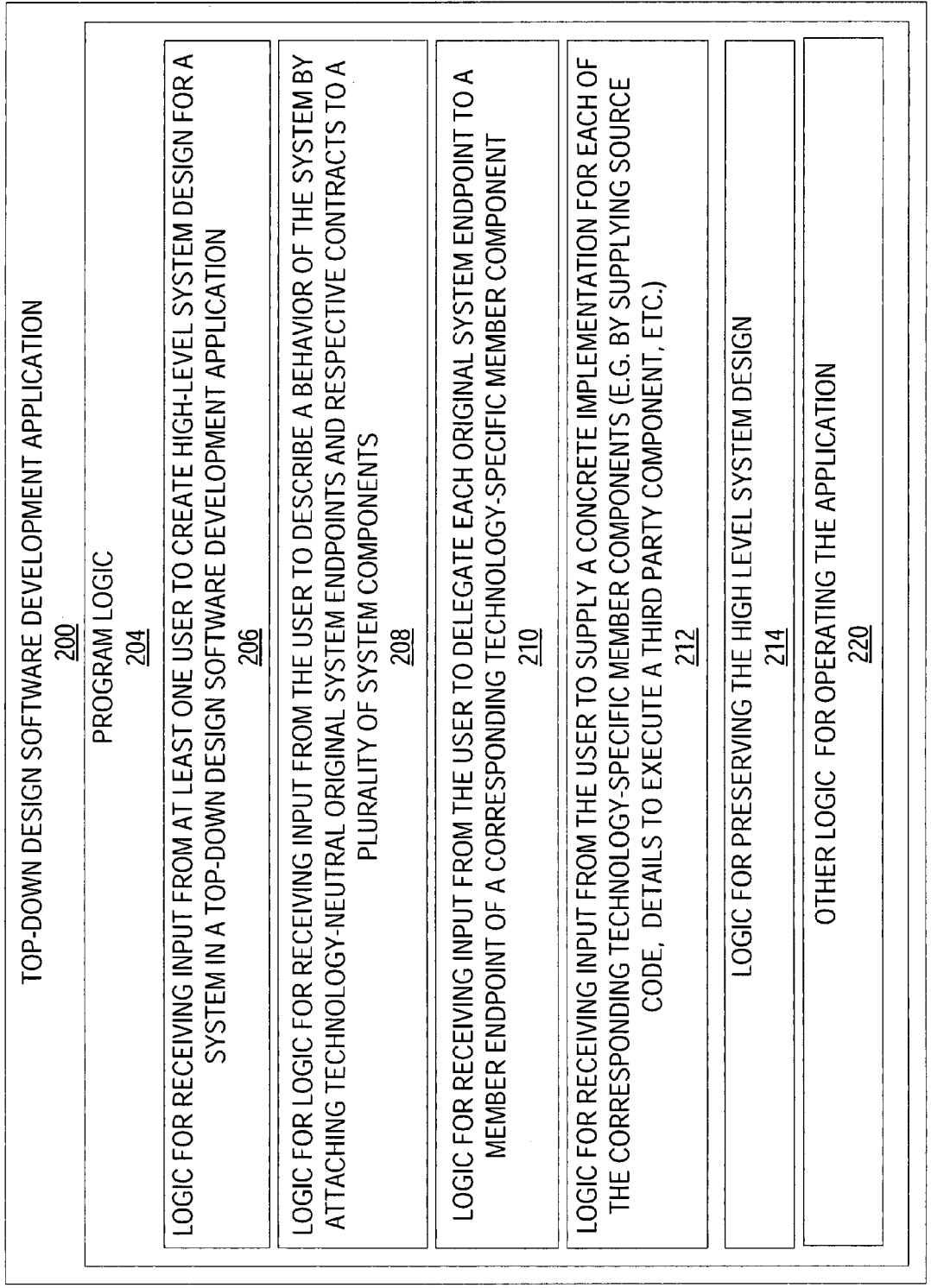
FIG. 2 is a diagrammatic view of a top-down design software development application of one implementation operating on the computer system of FIG. 1.

Turning now to FIG. 2 with continued reference to FIG. 1, a top-down design software development application 200 operating on computing device 100 is illustrated. Top-down design software development application 200 is one of the application programs that reside on computing device 100. However, it will be understood that top-down design software development application 200 can alternatively or additionally be embodied as computer-executable instructions on one or more computers and/or in different variations than shown on FIG. 1. Alternatively or additionally, one or more parts of top-down design software development application 200 can be part of system memory 104, on other computers and/or applications 115, or other such variations as would occur to one in the computer software art.

Top-down design software development application 200 includes program logic 204, which is responsible for carrying out some or all of the techniques described herein. Program logic 204 includes logic for receiving input from at least one user to create high-level system design for a system in a top-down design software development application 206; logic for receiving input from the user to describe a behavior of the system by attaching technology-neutral original system endpoints and respective contracts to a plurality of system components 208; logic for receiving input from the user to delegate each original system endpoint to a member endpoint of a corresponding technology-specific member component 210; logic for receiving input from the user to supply a concrete implementation for each of the corresponding technology-specific member components (e.g. by supplying source code, details to execute a third party component, etc.) 212; logic for preserving the high level system design 214; and other logic for operating the application 220. In one implementation, program logic 204 is operable to be called programmatically from another program, such as using a single call to a procedure in program logic 204.

Figure 3:
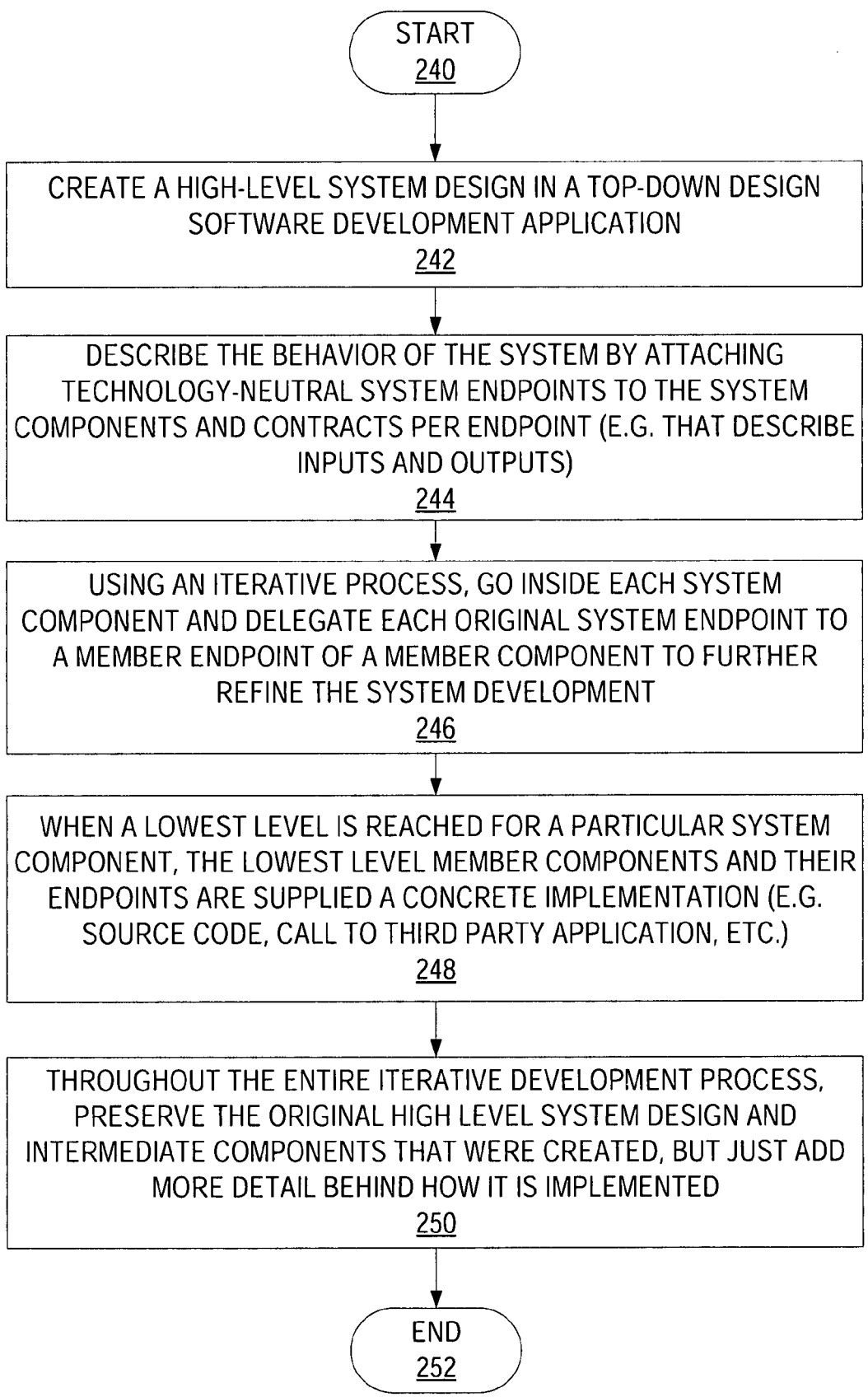
FIG. 3 is a high-level process flow diagram for one implementation of the system of FIG. 1.

Turning now to FIGS. 3-8 with continued reference to FIGS. 1-2, the stages for implementing one or more implementations of top-down design software development application 200 are described in further detail. FIG. 3 is a high level process flow diagram for top-down design software development application 200. In one form, the process of FIG. 3 is at least partially implemented in the operating logic of computing device 100. The process begins at start point 240 with creating a high-level system design in a top-down design software development application (stage 242). The user describes the behavior of the system by attaching technology-neutral system endpoints to the system components and contracts per endpoint (stage 244). In one implementation, the contracts describe one or more details regarding an intended operation of the system component, such as any applicable inputs and outputs going into the particular system component. The systems can be connected via the system endpoints to specify communication pathways.

Using an iterative process, the user goes inside each system component and delegates each original system endpoint to a member endpoint of member component to further refine the system development (stage 246). In other words, the user refines the system design by going inside each system component and decomposing it to further finer-grained technology-neutral or technology-specific member components and delegates each endpoint on the component to either technology-neutral or technology-specific endpoints on the member components. Along the way, additional member components and endpoints are added and connected as required by the design.

When a lowest level is reached for a particular system component, the lowest-level member components and their endpoints must all be technology-specific. For each technology-specific member component a concrete implementation is supplied by the user (e.g. source code, call to third party application, etc.) (stage 248). Throughout the entire iterative development process, the original high level system design and the design of each intermediate component that was created is preserved, including connections at each level. The refinement process has just added more detail behind how the system is implemented (stage 250). The process ends at end point 252.

Figure 4:
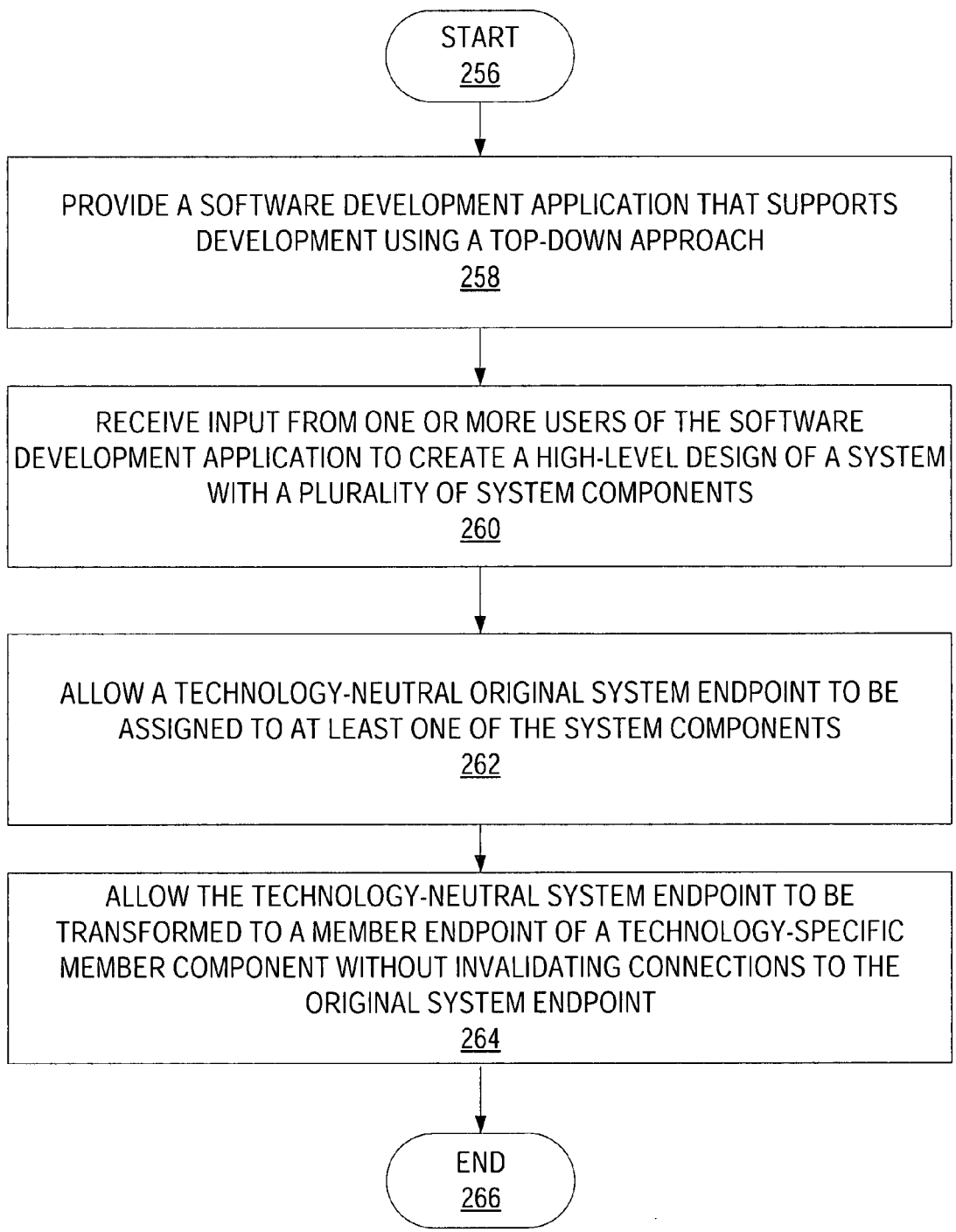
FIG. 4 is a process flow diagram for one implementation of the system of FIG. 1 illustrating the stages involved in transforming a technology-neutral system endpoint to a member endpoint for a technology-specific member component without invalidating connections to the original system endpoint.

FIG. 4 illustrates one implementation of the stages involved in the transforming a technology-neutral system endpoint to a proxy endpoint for a technology-specific member component without invalidating connections to the original system endpoint. In one form, the process of FIG. 4 is at least partially implemented in the operating logic of computing device 100. The process begins at start point 256 with providing a software development application that supports development using a top-down approach (stage 258). The system receives input from one or more users of the software development application to create a high-level design of a system with a plurality of system components (stage 260). A technology-neutral original system endpoint is allowed to be assigned to at least one of the system components (stage 262). The technology-neutral system endpoint is allowed to be transformed to a member endpoint of a technology-specific member component without invalidating connections to the original system endpoint (stage 264). The process ends at end point 266.

Figure 5:
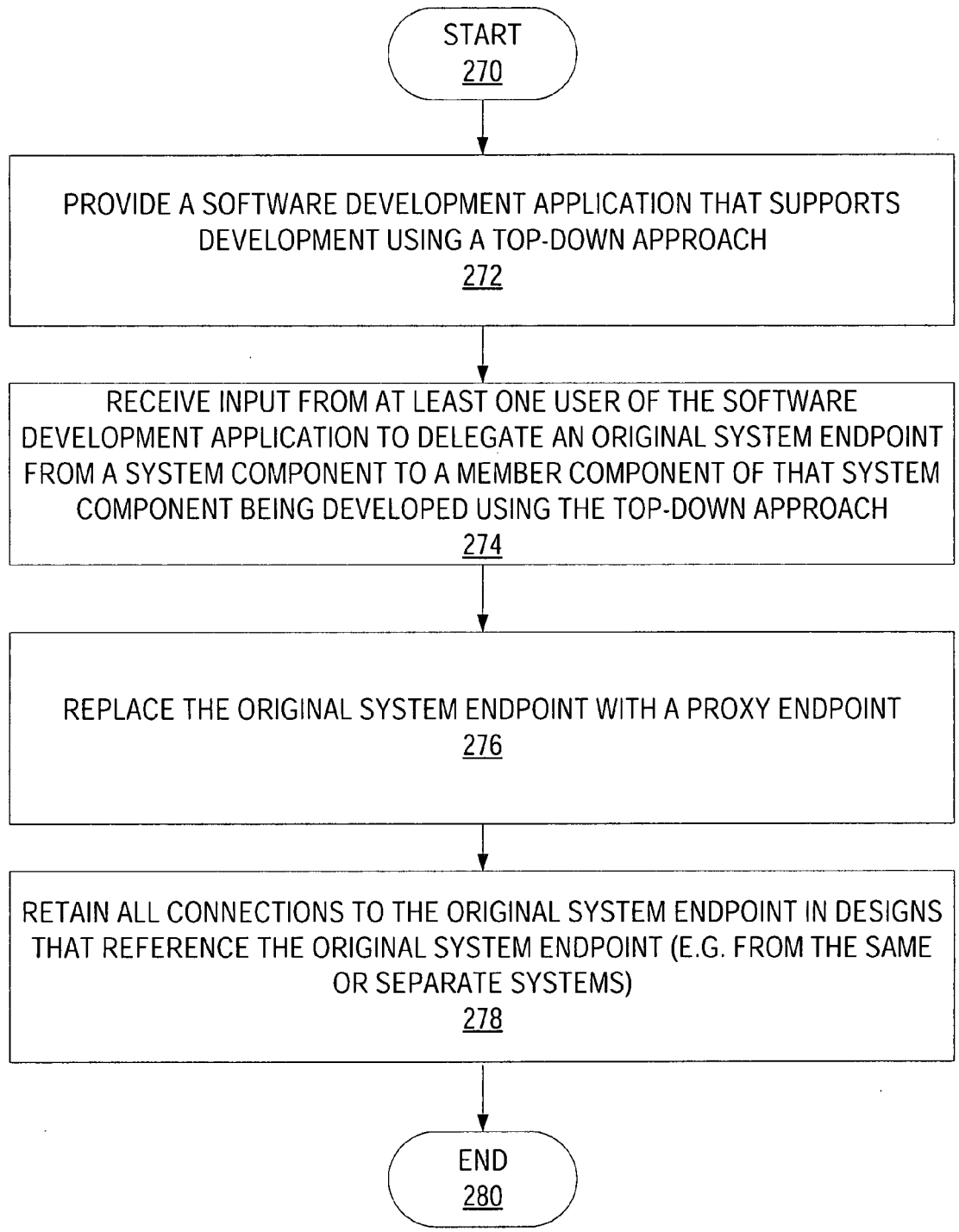
FIG. 5 is a process flow diagram for one implementation of the system of FIG. 1 illustrating the stages involved in delegating a system endpoint to create a member endpoint while retaining all connections to the original endpoint in any designs that reference the original system endpoint.

FIG. 5 illustrates one implementation of the stages involved in delegating a system endpoint to a member endpoint while retaining all connections to the original endpoint in any designs that reference the original system endpoint. In one form, the process of FIG. 5 is at least partially implemented in the operating logic of computing device 100. The process begins at start point 270 with providing a software development application that supports development using a top-down approach (stage 272). Input is received from at least one user of the software development application to delegate an original system endpoint from a system component to a member component of that system component being developed using the top-down approach (stage 274). The original system endpoint is replaced with a proxy endpoint (stage 276). All connections are retained to the original system endpoint in designs that reference the original system endpoint (e.g. from the same or separate systems) (stage 278). The process ends at end point 280.

Figure 6:
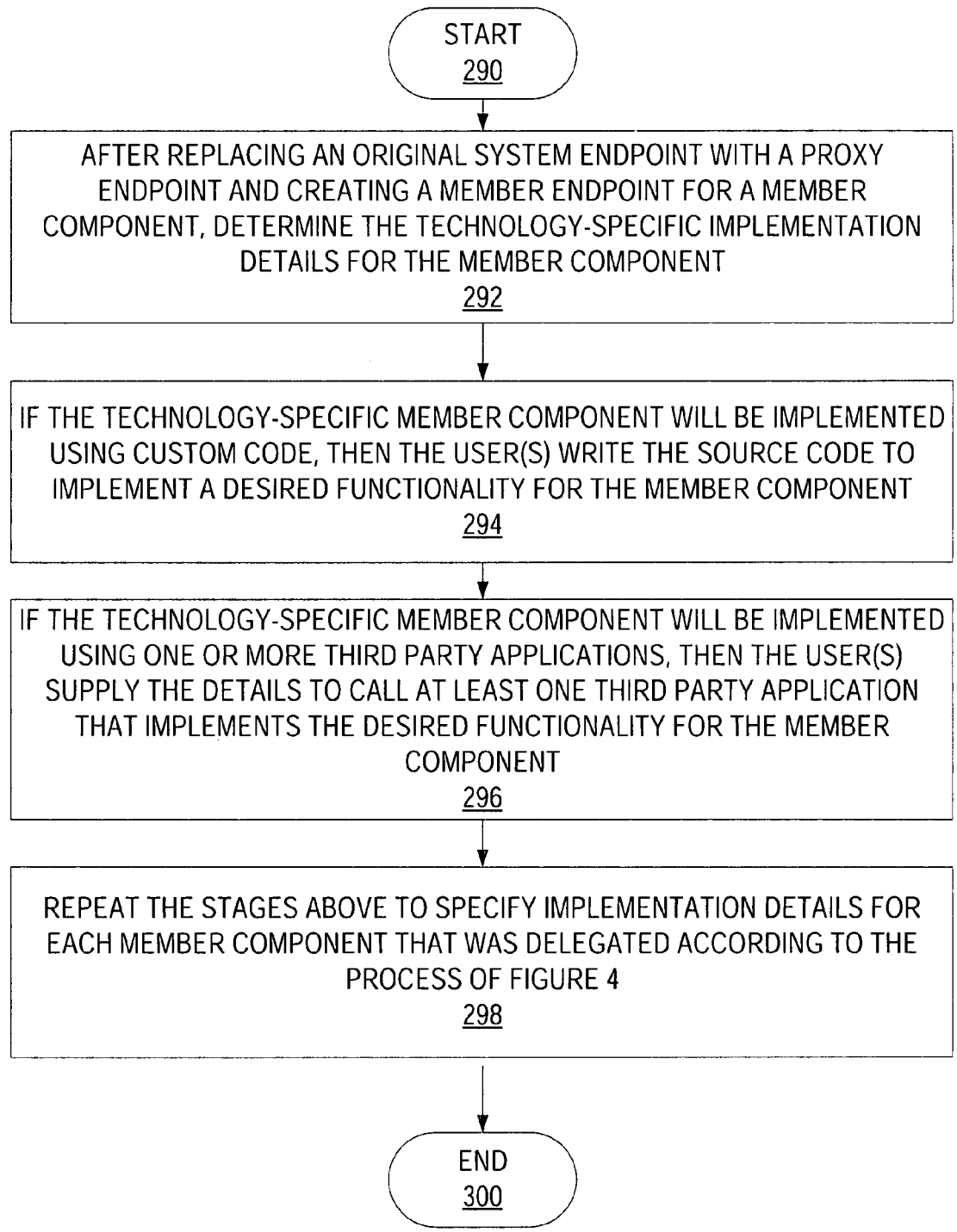
FIG. 6 is a process flow diagram for one implementation of the system of FIG. 1 illustrating the stages involved in supplying implementation details for a particular application component.

FIG. 6 illustrates one implementation of the stages involved in supplying implementation details for a particular application component. In one form, the process of FIG. 6 is at least partially implemented in the operating logic of computing device 100. The process begins at start point 290 with determining the technology-specific implementation details for the member component after replacing an original system endpoint with a proxy endpoint and creating a member endpoint for a member component (stage 292). In one implementation, the act of delegating a system endpoint to a technology-specific application component is the determinate of the implementation technology. If the technology-specific member component will be implemented using custom code, then the user(s) write the source code to implement a desired functionality for the member component (stage 294). If the technology-specific member component will be implemented using one or more third party applications, then the user(s) supply the details to call at least one third party application that implements the desired functionality for the member component (stage 296). The stages above are repeated to specify implementation details for each member component that was delegated according to the process of FIG. 5 (stage 298). When all member components have been provided with technology-specific implementation details, the application is complete (at least in a first form). The process ends at end point 300.

Figure 7:
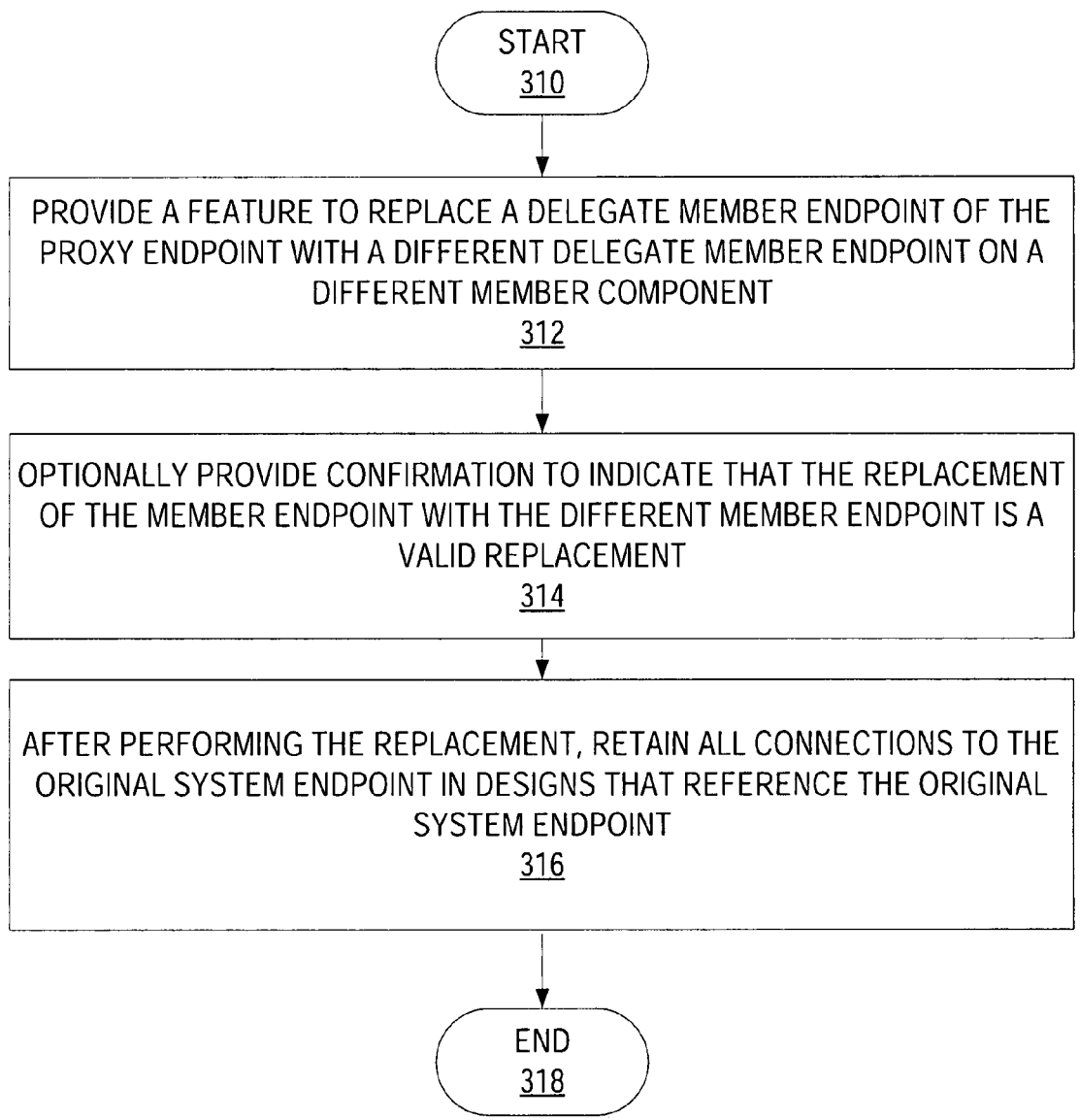
FIG. 7 is a process flow diagram for one implementation of the system of FIG. 1 that illustrates the stages involved in redirecting the connection from a proxy endpoint to a different member endpoint.

FIG. 7 illustrates one implementation of the stages involved in replacing a member endpoint with a different member endpoint. In one form, the process of FIG. 7 is at least partially implemented in the operating logic of computing device 100. The process begins at start point 310 with providing a feature to replace a delegate member endpoint of the proxy endpoint with a different delegate member endpoint on a different member component (stage 312). Optionally provide confirmation to indicate that the replacement of the member endpoint with the different member endpoint is a valid replacement (stage 314). After performing the replacement, retain all connections to the original system endpoint in designs that reference the original system endpoint (stage 316). The process ends at end point 318.

Figure 8:
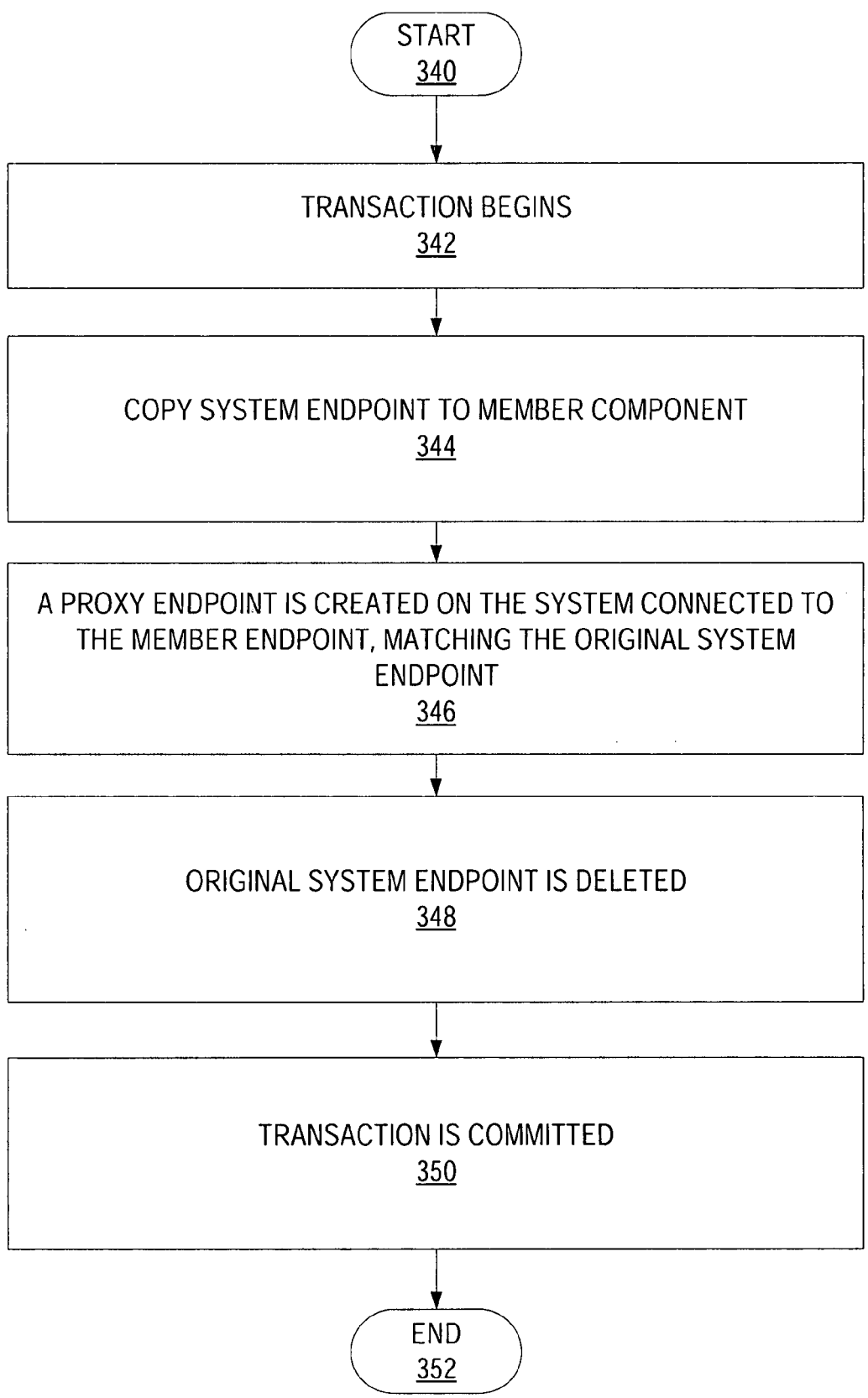
FIG. 8 is a process flow diagram for one implementation of the system of FIG. 1 that illustrates the stages involved in ensuring connections to original system endpoints are preserved when assigning and/or re-assigning member endpoints.

FIG. 8 illustrates one implementation of the stages involved in ensuring connections to original system endpoints are preserved while connections from the system endpoint are assigned and/or re-assigned to member endpoints. In one form, the process of FIG. 8 is at least partially implemented in the operating logic of computing device 100. The process begins at start point 340 with beginning a transaction (stage 342). The system endpoint is copied to a member component (stage 344). A proxy endpoint is created on the system connected to the member endpoint, matching the original system endpoint (stage 346). The original system endpoint is deleted (stage 348). The transaction is committed (stage 350). The process ends at end point 352.

Turning now to FIGS. 9-15, simulated screens are shown to illustrate a user interface that allows a user to create a new hypothetical banking system using top-down design software development application 200. The same reference numbers will be used to refer to the same elements on these simulated screens. These screens can be displayed to users on output device(s) 111. Furthermore, these screens can receive input from users from input device(s) 112.

Figure 9:
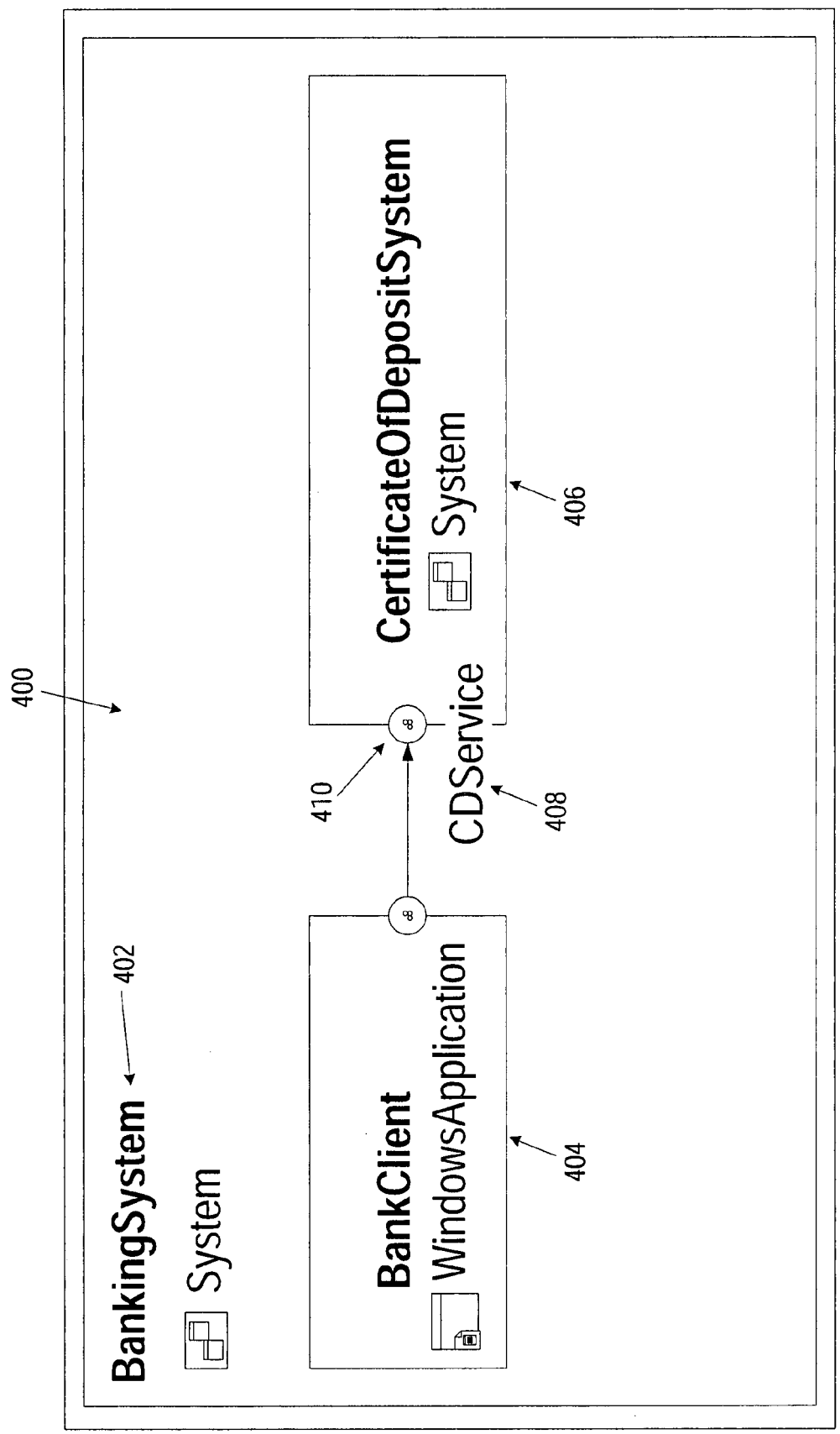
FIGS. 9-15 are simulated screens that illustrate various stages of a user interface during an iterative approach to developing a hypothetical banking application using the top-down design software application of FIG. 1.
Figure 10:
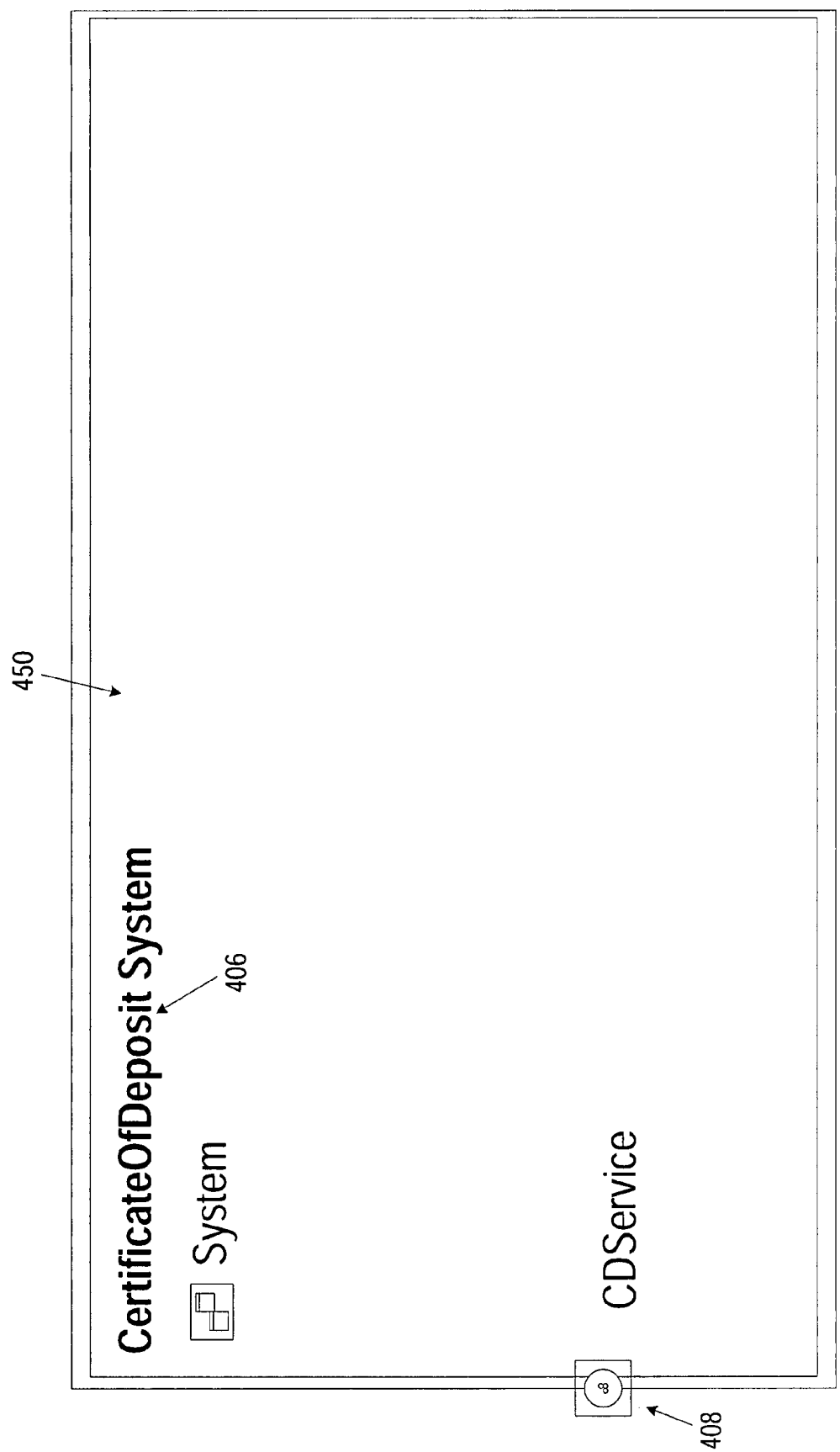
Figure 11:
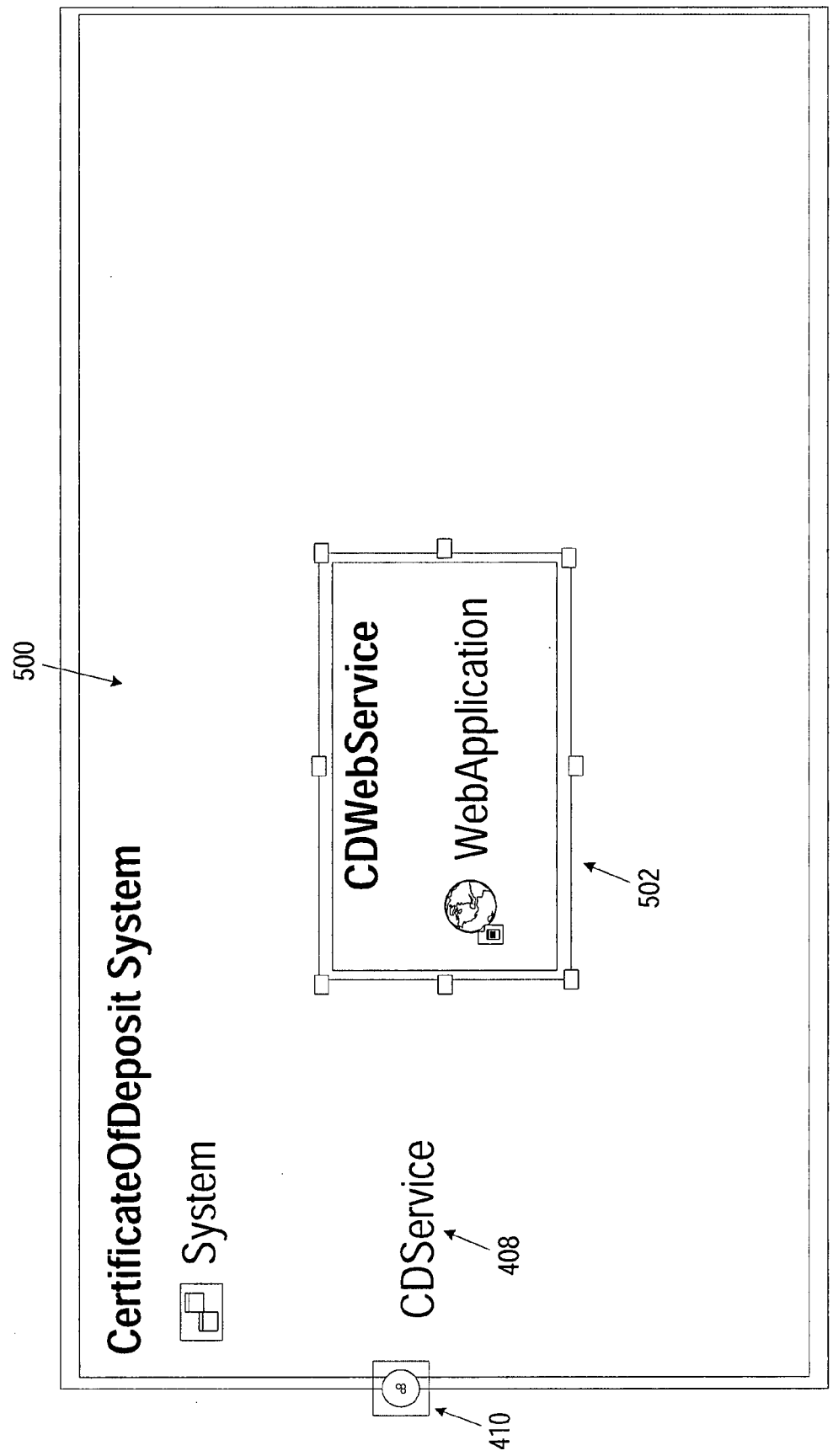

FIG. 9 is a simulated screen 400 that illustrates a hypothetical banking system 402 that contains a Bank Client 404 that is a Windows application, and a Certificate of Deposit System 406. The Certificate of Deposit System 406 has a defined service, called CD Service 408 that the Bank Client 404 is consuming. CD Service 408 is currently associated with an original system endpoint 410. Turning now to the simulated screen 450 of FIG. 10, within the Certificate of Deposit System 406, the CD Service 408 has been defined, but has not yet been delegated to any application to realize the functionality defined within the CD Service 408. As shown in the simulated screen 500 of FIG. 11, an application called CD Web Service 502 has been added that will eventually realize the functionality of the CD Service 408.

Figure 12:
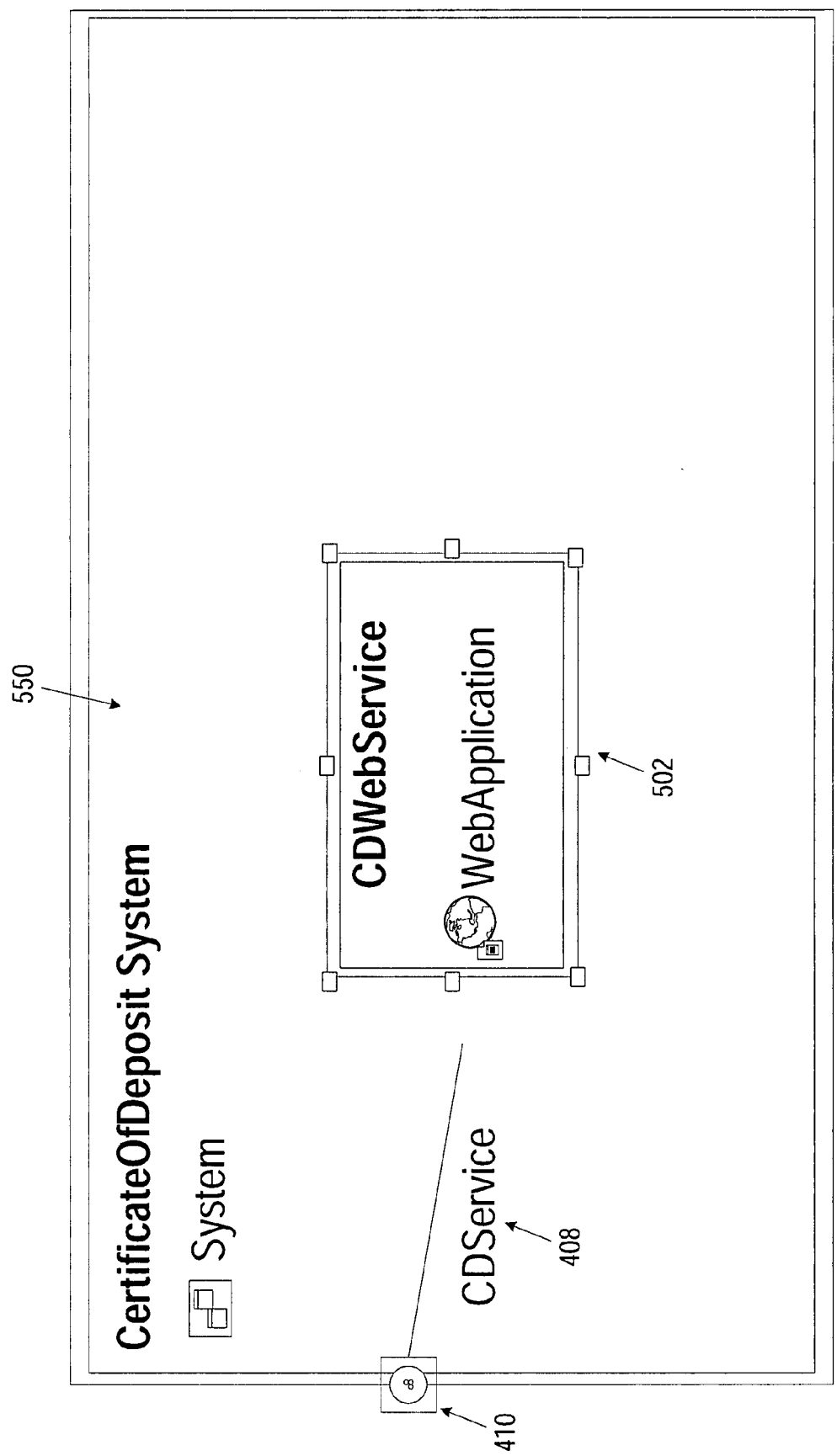
Figure 13:
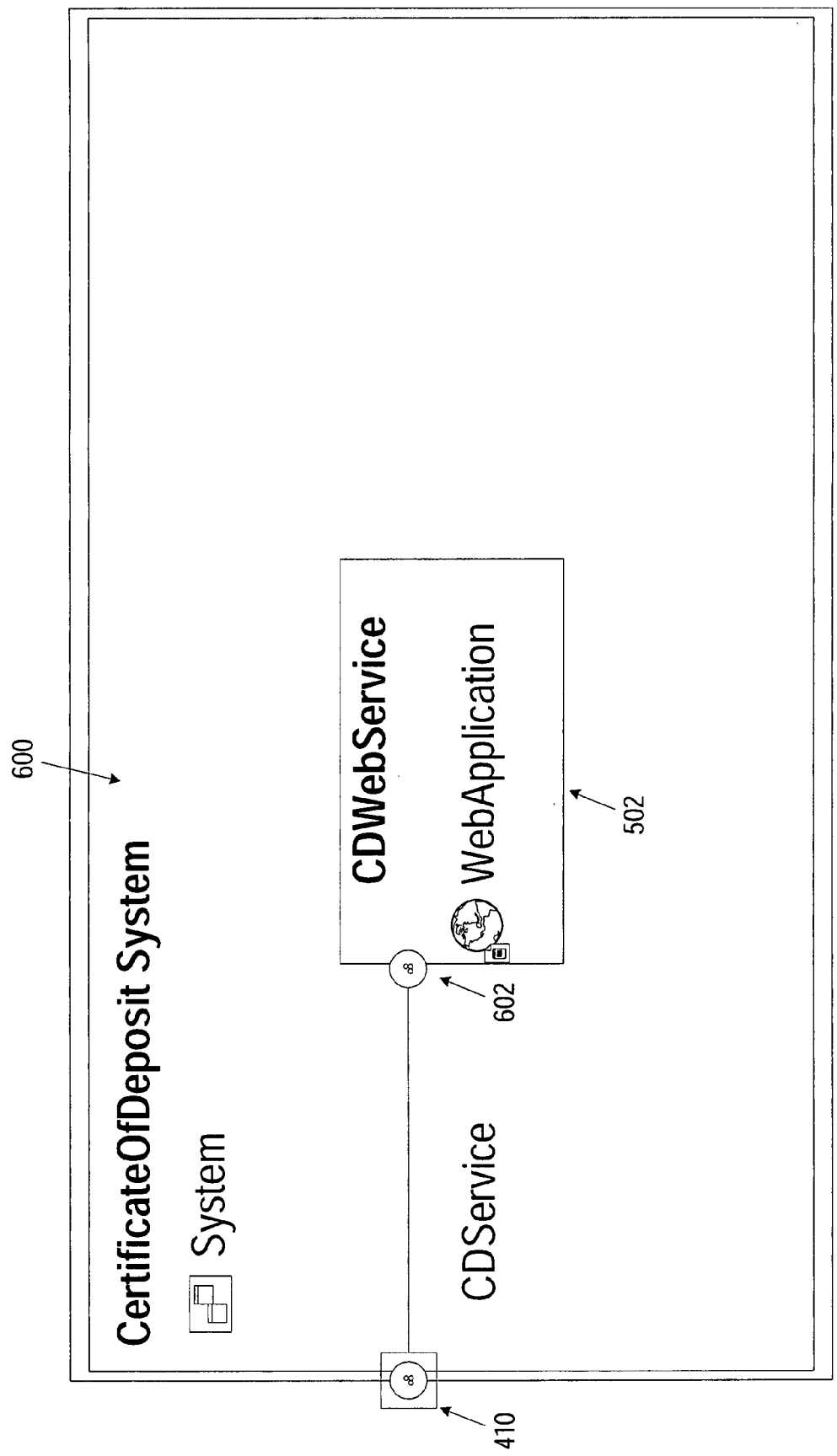
Figure 14:
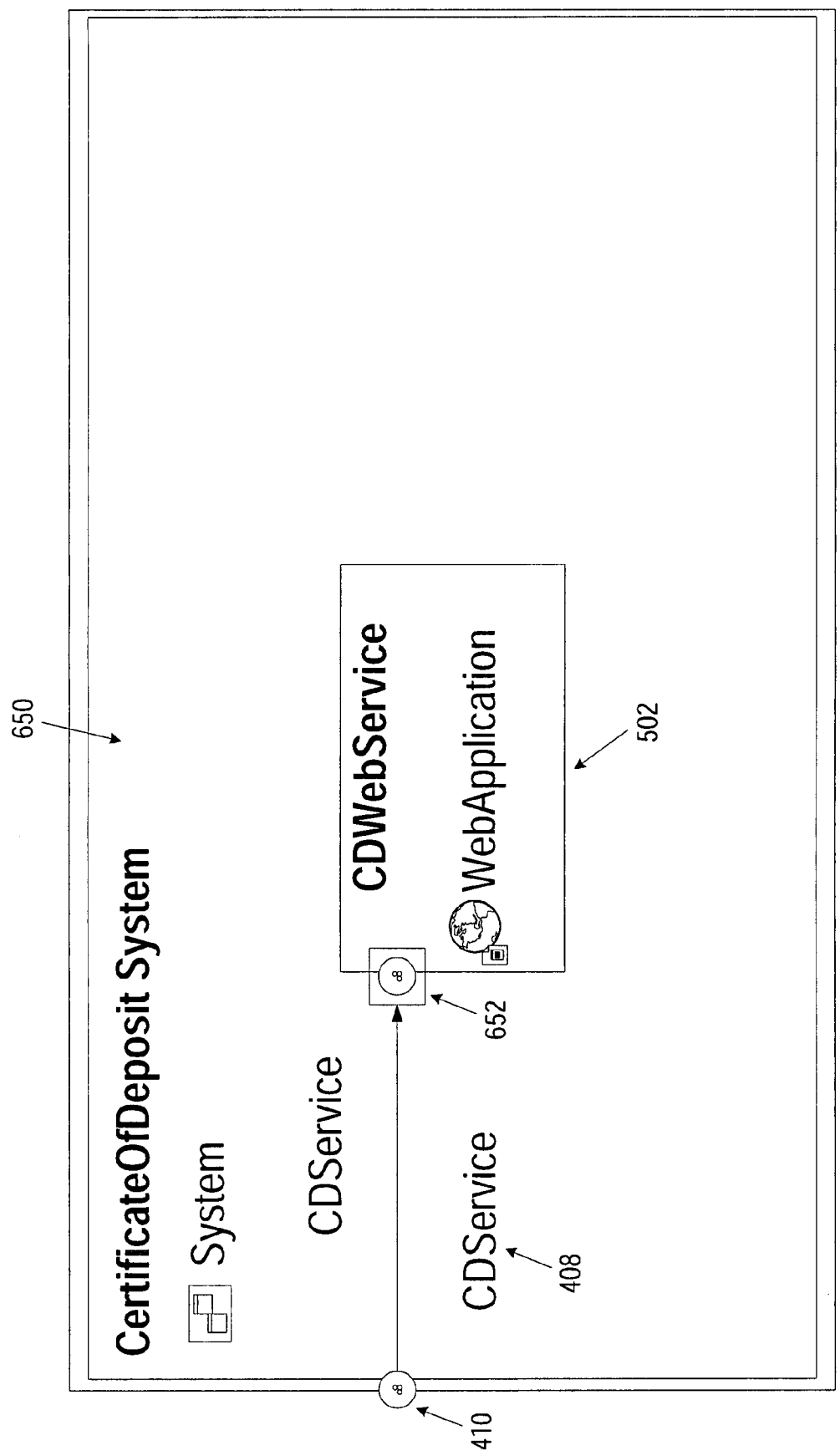
Figure 15:
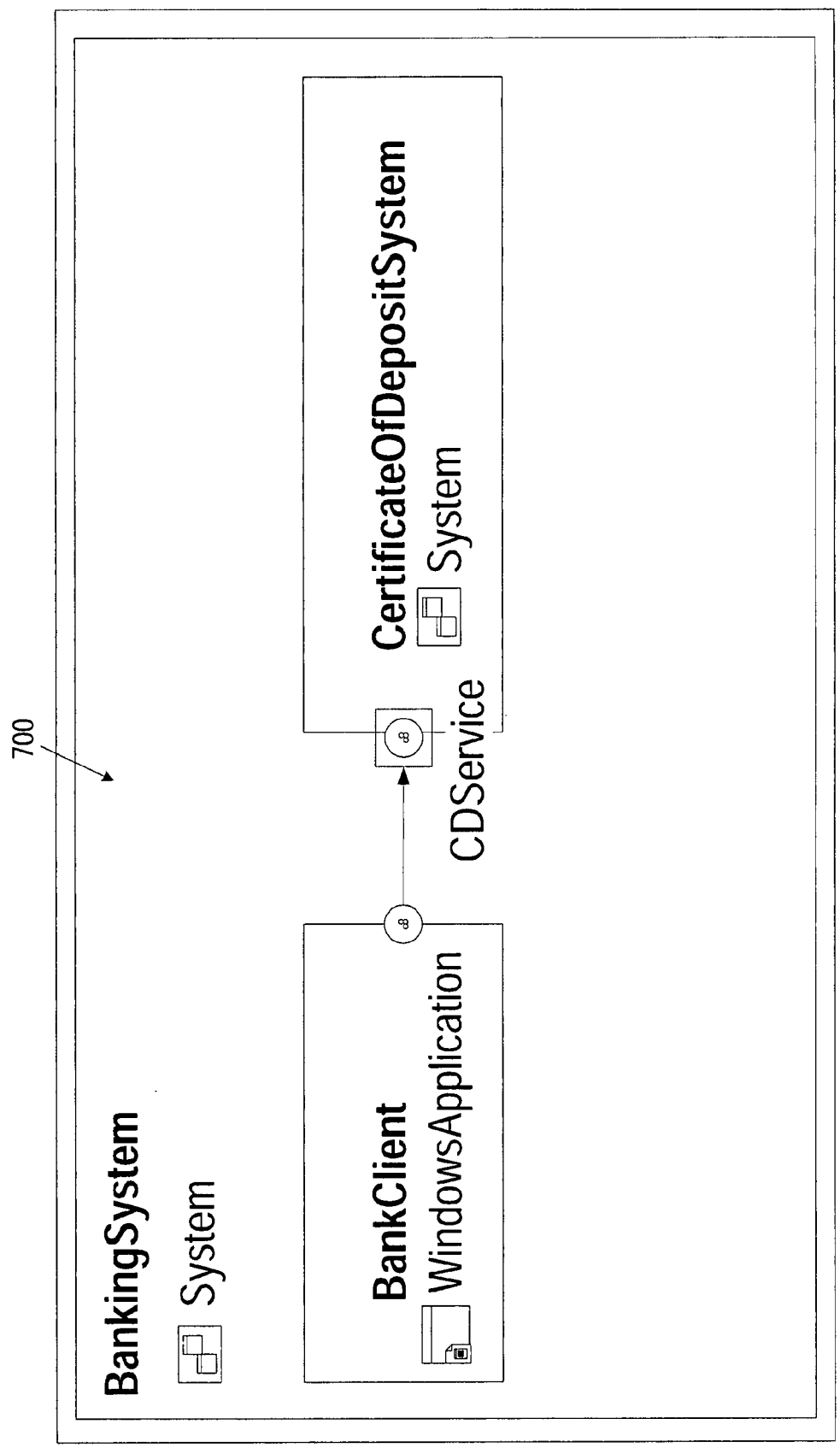

Turning now to FIG. 12-14, the user actions to delegate the CD Service 408 onto the CD Web Service Application 502 are shown. In the simulated screen 550 of FIG. 12, the user begins an operation to delegate the CD Service 408 from the original system endpoint 410 to a member endpoint of the CD Web Service 502. In one implementation, the system allows the user to delegate to a member component (and not directly to a member endpoint). The delegate action copies the original system endpoint to the member component, thereby creating the member endpoint. At the point shown in the simulated screen 600 of FIG. 13, the original system endpoint 410 is shown connected to the CD Web Service 502 at connection point 602. The delegation is then completed as shown in the simulated screen 650 of FIG. 14 by illustrating that calls to the original system endpoint 410 for CD Service 408 are delegated into the CD Service member endpoint 652. After the entire process is completed, the original system design is still preserved, as shown in the simulated screen 700 of FIG. 15. Notice how the simulated screen 700 contains an identical design to the original design contained in FIG. 9.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for developing software using a top-down design comprising the steps of:
    providing a software development application that supports development using a top-down approach;
    using a processing unit, receiving input from at least one user of the software development application to describe a behavior of an original system by attaching technology-neutral original system endpoints and respective contracts to a plurality of original system components;
    using the processing unit, receiving input from the at least one user of the software development application to delegate an original system endpoint from an original system component to a member component of the original system being developed using a top-down approach;
    determining technology-specific implementation details for the member component;
    implementing a desired functionality for the member component by using user specified source code or calling at least one third party application;
    replacing the original system endpoint with a proxy endpoint;
    retaining all connections to the original system endpoint in designs that reference the original system endpoint; and
    replacing a delegate member endpoint of the proxy endpoint with a different delegate member endpoint on a different member component while still retaining all connections to the original system endpoint in designs that reference the original system endpoint.

2. The method of claim 1, wherein the third party application is a web service.

3. The method of claim 1, wherein a confirmation is provided to indicate that replacing the member endpoint with the different member endpoint is a valid replacement.

4. The method of claim 1, wherein the system component is operable to be called from a separate system.

5. A computer-readable storage medium having computer-executable instructions for causing a computer to perform the steps recited in claim 1.

6. A computing device comprising:
    a processing unit coupled to a memory, the memory comprising computer-executable instructions for causing the computing device to:
    provide a software development application that supports development using a top-down approach;
    receive input from at least one user of the software development application to describe a behavior of an original system by attaching technology-neutral original system endpoints and respective contracts to a plurality of original system components;
    receive input from the at least one user of the software development application to delegate an original system endpoint from an original system component to a member component of the original system being developed using a top-down approach;
    determine technology-specific implementation details for the member component;
    implement a desired functionality for the member component by using user specified source code or calling at least one third party application;
    replace the original system endpoint with a proxy endpoint;
    retain all connections to the original system endpoint in designs that reference the original system endpoint; and
    replace a delegate member endpoint of the proxy endpoint with a different delegate member endpoint on a different member component while still retaining all connections to the original system endpoint in designs that reference the original system endpoint.

7. A computer-readable storage medium having computer-executable instructions for causing a computer to perform steps comprising:
    providing a software development application that supports development using a top-down approach;
    using a processing unit, receiving input from at least one user of the software development application to describe a behavior of an original system by attaching technology-neutral original system endpoints and respective contracts to a plurality of original system components;
    using the processing unit, receiving input from the at least one user of the software development application to delegate an original system endpoint from an original system component to a member component of the original system being developed using a top-down approach;
    determining technology-specific implementation details for the member component;
    implementing a desired functionality for the member component by using user specified source code or calling at least one third party application;
    replacing the original system endpoint with a proxy endpoint;
    retaining all connections to the original system endpoint in designs that reference the original system endpoint; and
    replacing a delegate member endpoint of the proxy endpoint with a different delegate member endpoint on a different member component while still retaining all connections to the original system endpoint in designs that reference the original system endpoint.

8. The computer-readable storage medium of claim 7, wherein the software development application allows a concrete implementation to be supplied for a particular one of the corresponding technology-specific member components by supplying details that will allow an application created by a third party to be executed.

* * * * *